Sept. 3, 1946.     W. C. HUEBNER     2,406,770
CAMERA
Filed Dec. 6, 1943     4 Sheets-Sheet 3
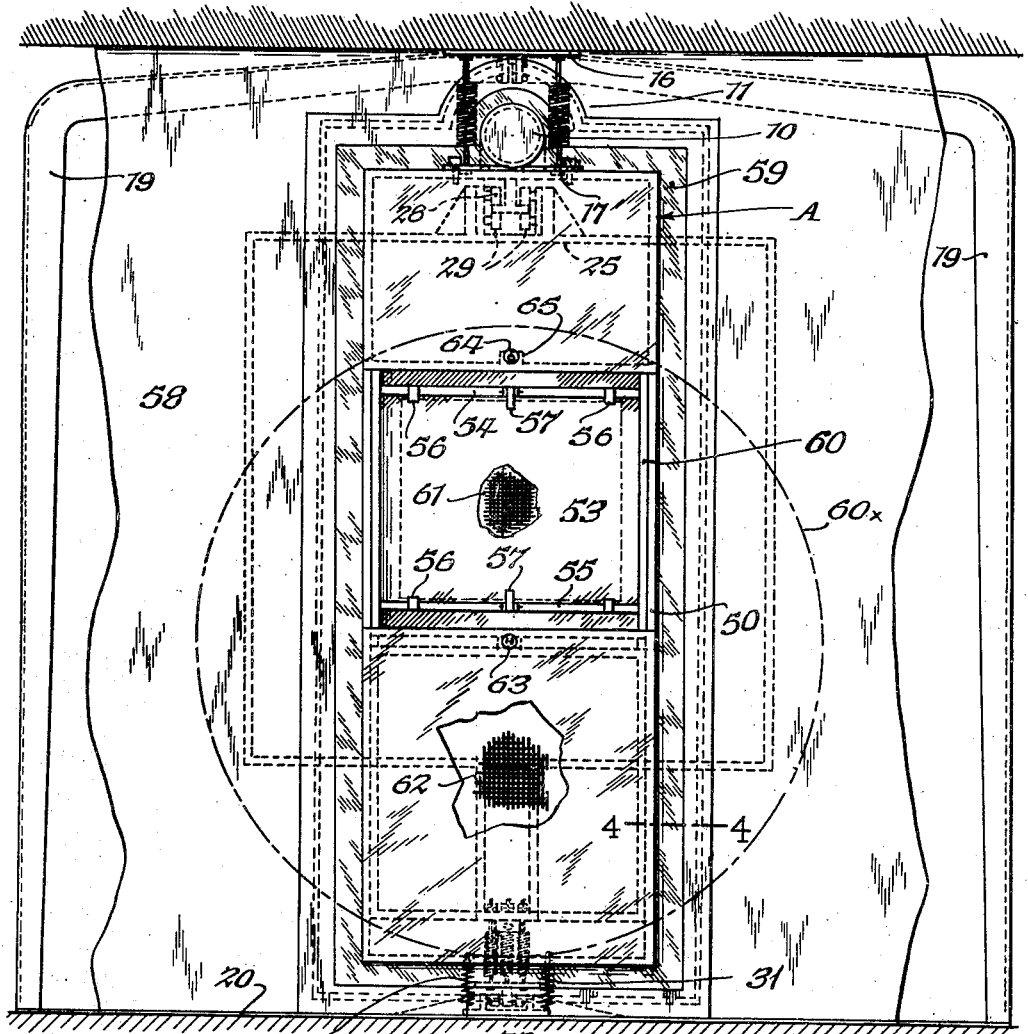

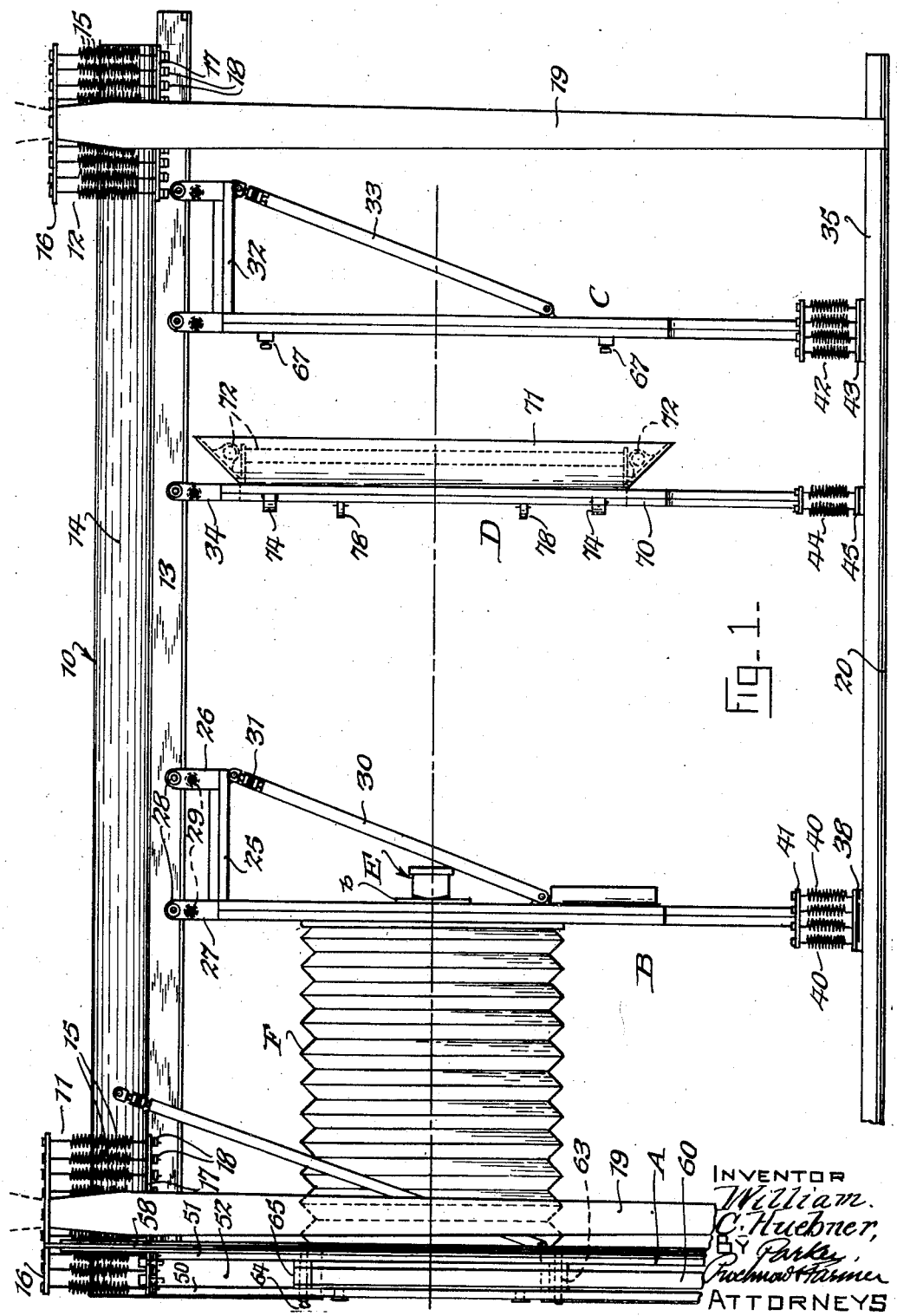

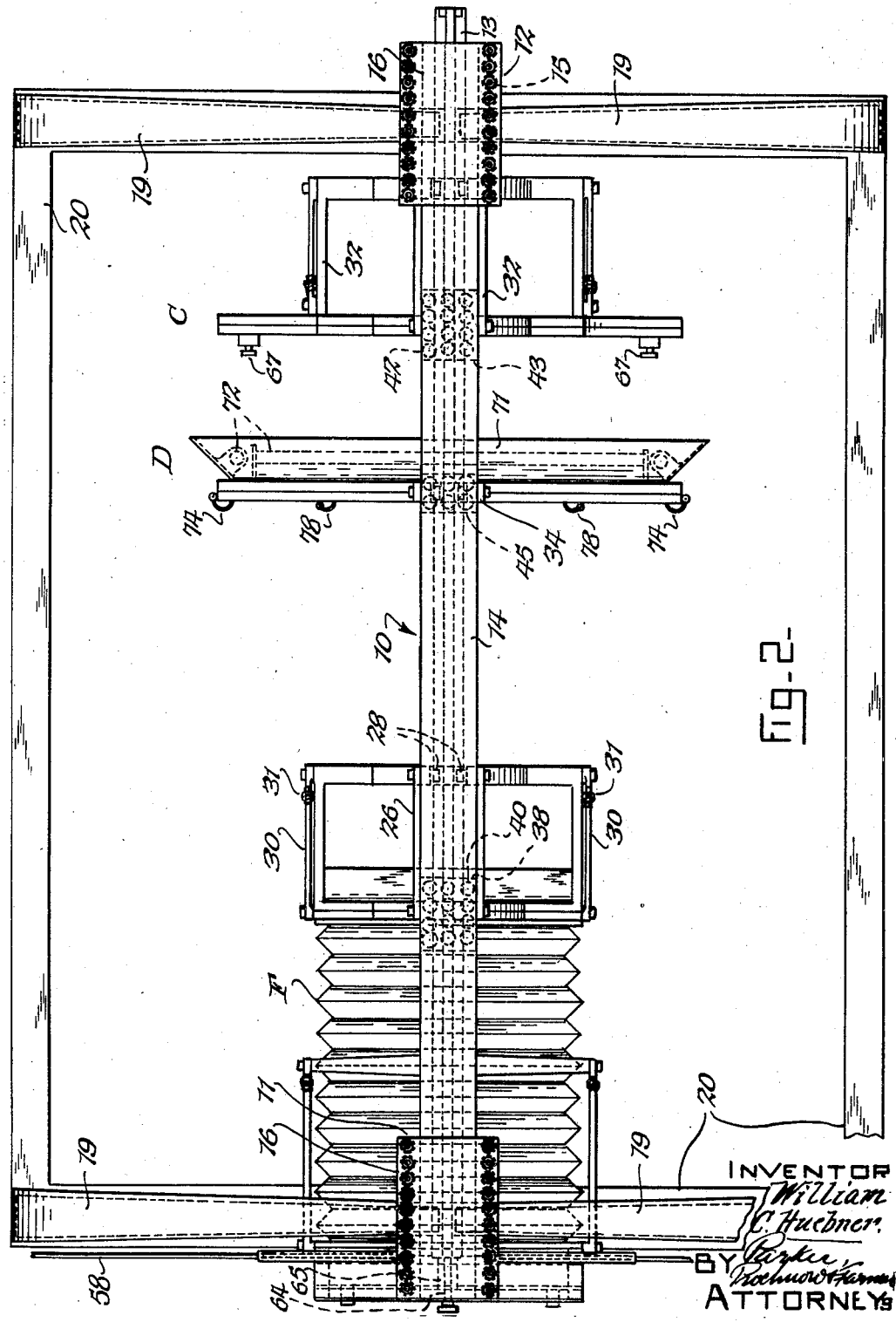

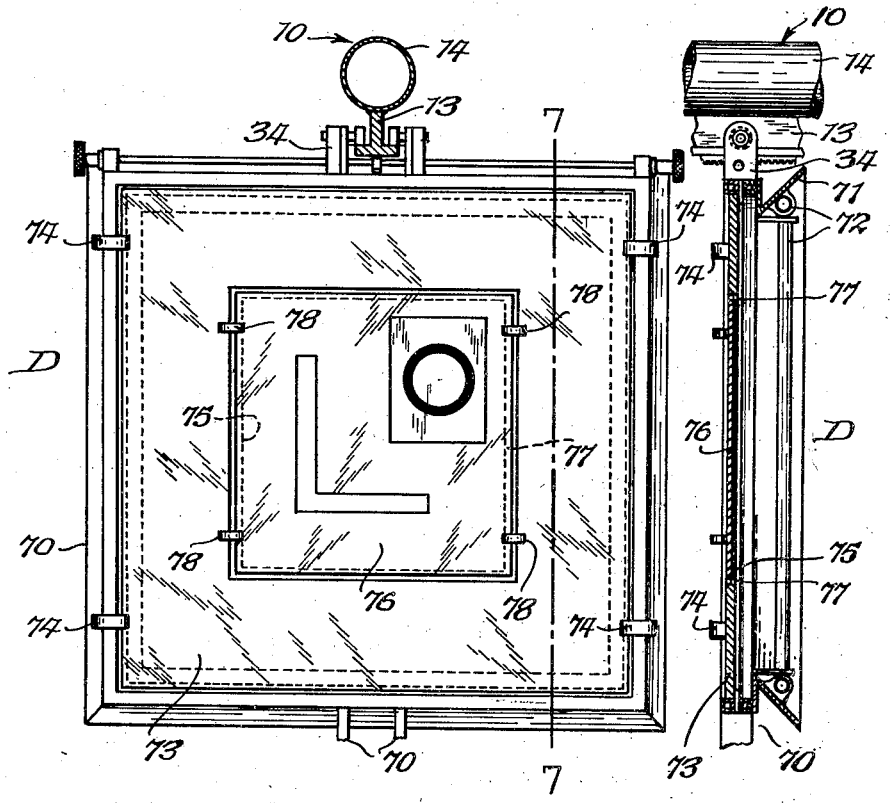

Patented Sept. 3, 1946

2,406,770

UNITED STATES PATENT OFFICE 2,406,770

CAMERA

William C. Huebner, New York, N. Y.

Application December 6, 1943, Serial No. 513,012

11 Claims. (Cl. 88—24)

This invention relates to improvements in cameras and more especially, but not exclusively, to cameras for obtaining photomechanical color separation negatives made from the copy through a half tone or other screen or grid to produce the required textures for use on printing plates. In addition to use for producing photomechanical printing work, the camera is also adapted, for example, for making metal or plastic photo-templates where the metal or plastic plates or parts are held on the copyboard or carrier of the camera and have sensitized surfaces to receive images projected through the camera lens onto said sensitized surfaces.

In common with cameras of this class, the improved camera of this application comprises a carrier or holder for the sensitized or negative plate and the photomechanical screen or grid, and carriers or holders for the lens and copy, and also preferably, for a light source for illuminating the copy, which latter carriers are adjustable relatively to the sensitized plate carrier and to each other for focusing and obtaining the required size of the photographic image.

One object of my invention is to construct the camera so that these several parts or elements are supported or suspended from a single overhead rail, on which the movable elements are relatively adjustable, in such a manner that while they are resiliently supported, to absorb or counteract disturbing vibrations to which they may be subjected, the parts or elements nevertheless will be maintained in parallelism perpendicularly to the axis of the camera lens and prevented from shifting or movement so as to throw their vertical centers or centers of gravity out of the vertical plane of the axis of the lens.

It has been found that cameras for photomechanical purposes, such for instance as shown in U. S. Patent #2,150,974, issued to me March 21, 1939, where the camera elements are suspended from two overhead rails arranged at opposite sides of a horizontal overhead supporting member, have proven to be practical for photomechanical purposes. In recent years, such overhead suspended cameras have been and are now being successfully used on photo-template work, but when heavy templates or parts are mounted on the copy carrier and these parts are of nonsymmetrical shape, or are not properly centered on the carrier and may overhang the center of gravity, the tendency is to pull the carrier sideways and throw the camera elements out of their intended alined positions.

Tests have shown that if the movable carriers or camera elements are suspended from an overhead central monorail and provided with resilient tensioning means held in connection with a base track centrally beneath the elements and parallel with the supporting monorail so as to travel with the movable camera elements, the center of gravity will be maintained as well as the alinement of the elements, and will ensure precision work without the side strain and distortion or displacement of the parts which is present when the elements are not so held under tension on the central or center of gravity plane. Another object of my invention, therefore, is to provide means for effectually so holding the adjustable elements suspended from the overhead monorail, from shifting or swinging laterally relatively to the vertical, central plane of the camera.

It has also been found desirable to mount the photomechanical screens or grids, which are used in front of the sensitized plate, so that different screens or grids are carried by a holder mounted to rotate in a vertical, transverse plane about a center between the screens, so that one or another of the screens or grids can be easily and immediately placed in operative position in the path of light travelling from the lens to the sensitized plate simply by rotating and locking the screen holders. With this arrangement, one screen will occupy a position vertically below the screen which is in use and nearer to the floor and center of gravity of the camera, so that the center of weight of the camera, instead of being spread to one or the other side of its central, vertical plane, is maintained in such vertical plane. Such a rotatable interchangeable mounting of the photomechanical screens or grids constitutes another object of the invention.

By constructing and arranging the parts or elements of the camera in the manner indicated, the construction of the camera is materially simplified and it is possible to build a lower priced camera having a better moving weight distribution, and enable faster and more economical operation with resulting improvement in the work.

Additional objects of the invention are to provide the camera with an adjustable, open illuminating frame or carrier for the source of light, or lamps for illuminating the copy, in which lamps are disposed around the frame opening, and the frame is provided with means also disposed around said opening for reflecting the light from the lamps evenly over the surface of the copy; and also to construct said illuminating frame so as to adapt it to hold transparencies for making photographic copies therefrom by light reflected through the transparencies from a reflecting surface on the copyholder.

Further objects and advantages of the invention will appear from the following specification of preferred embodiments of the invention, shown in the accompanying drawings, and the novel features of the invention are set forth in the appended claims.

In said drawings:

Fig. 1 is a side elevation, partly broken away, of a camera embodying my invention;

Fig. 2 is a top plan view thereof;

Fig. 3 is an end elevation of the sensitized plate carrier end of the camera;

Fig. 4 is a transverse sectional elevation thereof on line 4—4, Fig. 1;

Fig. 5 is a horizontal section thereof on line 5—5, Fig. 3;

Fig. 6 is a transverse, sectional elevation showing the illuminating carrier or frame provided with means for holding transparencies thereon; and Fig. 7 is a longitudinal, sectional elevation of said carrier on line 7—7, Fig. 6.

The camera comprises, as usual, upright carriers or holders A, B and C respectively for the sensitized plate, for the camera lens and for the copy, and also preferably an upright frame or carrier D for the light source or lamps for illuminating the copy on the copy carrier. These several carriers are disposed parallel with each other in transverse planes perpendicular to the axis of the camera lens E, with the lens carrier and lens disposed between the sensitized plate carrier and the copy carrier, and with the illuminating frame or carrier D located between and parallel with the lens and copy carriers. The camera lens is mounted on the lens carrier B by the usual adaptor plate $b$ and the usual bellows F connects the lens carrier with the sensitized plate carrier forming therewith the dark camera chamber.

Said carriers are all suspended from and supported by a rigid monorail or supporting beam 10 which extends horizontally overhead or above the carriers in the central, vertical plane of the camera, or vertical plane of the lens axis. This rail or beam is resiliently supported, so as to yieldingly support the carriers, by spaced resilient supports, of which there are preferably two, 11 and 12, disposed adjacent opposite ends of the rail and which are so constructed that the rail is maintained approximately in said vertical plane, but is capable of slight bodily yielding or resilient motion. As shown, the monorail 10 has a lower portion 13 of inverted T-shaped in cross section welded or otherwise secured on the bottom of a tubular upper portion 14 from which the portion 13 depends in the vertical axial plane of the tube. The connected T and tubular rail portions provide a single, integral, horizontal supporting rail or beam which is very stiff and rigid and adapted to sustain heavy weights without deflection or bending between its supports. Each of the resilient supports 11 and 12 for the monorail is preferably formed by a plurality or cluster of vertical coil springs 15 attached at their opposite ends to horizontal plates 16 and 17 and provided with nuts 18 for individually adjusting or equalizing the tension of said springs. The plates 17 may be welded or otherwise rigidly attached to the monorail 10 and project to opposite sides thereof. The plates 16 may be stationarily supported in any appropriate way, either by rigidly securing them on strong, rigid standards 19, 19, secured on and rising from the floor or other suitable foundation, or where the camera is installed in a building having a ceiling structure of adequate strength, the plates 16 may be rigidly fastened to such ceiling structure as, for example, by hangers, indicated by broken lines in Fig. 1. The monorail 10 is thus resiliently suspended by spring means adapted to be adjusted so as to maintain the rail horizontally but permit limited bodily yielding or resilient shock-absorbing motion thereof. Two pairs of the standards 19 are shown fixed on a base plate 20, stationarily fastened on the floor or foundation and they have inwardly extending upper portions between and to which the supporting plates are fixed.

As stated, the carriers A, B, C and D are supported by and suspended from the monorail 10. Since the sensitized plate carrier A does not have to be adjusted, it may be bolted or otherwise fixed at its upper end to the plate 17 of the spring support 11, which is fixed to the monorail, and at its lower end it is preferably anchored to the base plate 20, as by springs 31, Fig. 3, suitably attached, preferably adjustably, to the middle portion of the lower end of the carrier A and to the base plate 20.

The carriers for the lens, copy and illuminating means are suspended from the monorail 10 so as to be adjustable along the rail, by suitable carriages arranged to travel on the rail. As shown, the carriage for the lens carrier B comprises a frame 25 which is disposed horizontally beneath the monorail 10 and is provided with front and rear pairs of bearing supports 26 and 27 which extend upwardly on opposite sides of the rail, and each of which is provided with a pair of rollers 28, 29, one arranged to roll on the upper face of the adjacent horizontal flange of the T-portion 13 of the monorail 10 and the other to roll against the under face of said flange, so as to support and guide the carriage and prevent it from vertical play or tipping out of its horizontal position. Preferably, each of these rollers is mounted by means of a known eccentrically adjustable journal so that the axis of each roller can be adjusted to thereby enable the adjustment of the carriage a true horizontal position and insure its free travel along the rail, while preventing tilting of the carriage. The lens carrier is connected to and depends from the rear end of the carriage 25 and is additionally connected therewith by braces 30 which are suitably pivoted at their upper ends to the front side portions of the carriage frame, and at their lower ends to the side portions of the lens carrier B. These braces have turn buckles 31, or other suitable provision is made for adjusting the length of the braces or their connections with the carriage or lens carrier, so that by adjusting these means, the lens carrier can be accurately set in a vertical plane perpendicular to the horizontal plane of the carrier 25 and parallel with the vertical plane of the sensitized plate in the plate carrier A.

The copy carrier C is supported by and depends from a carriage 32 which is arranged to travel on the monorail 10 and may be and preferably is similar to the carriage 25 for the lens carrier, and likewise has adjustable upper and lower front and rear rollers arranged to roll on the top and bottom faces of the monorail flanges, and braces 33 adjustably connecting the side front portions of the carriage with the copy carrier for setting or adjusting the copy carrier to parallelism with the vertical planes of the sensitized plate and lens carrier and perpendicular to the horizontal plane of its carriage 32.

Likewise, the illuminating carrier D depends from a carriage 34 mounted by pairs of adjustable rollers at opposite sides of the monorail and arranged to roll against the upper and lower faces of the opposite flanges of the rail.

Each of the adjustable copy, lens and illuminating carriers B, C and D is subjected to a downward, resilient tension which tends to hold the carrier in its intended vertical position with its vertical center line in the vertical plane of the lens axis and resiliently oppose the shifting thereof out of this position under any unbalanced weight or force tending to throw the carrier out of such centered position. The means for exerting this downward tension on said carriers is preferably constructed as follows:

35 represents a base rail which is stationarily secured to extend horizontally in the vertical plane of and beneath the overhead monorail 10, on the base plate 20 or other supporting foundation. As shown in Fig. 4, this base rail is a trap rail having spaced, upstanding side members 36 with inwardly projecting top flanges separated by a longitudinal slot. Referring first to the tensioning means for the lens carrier B, 38 indicates a traveller or carriage located centrally beneath the carrier and which may be of T-shape in vertical cross section, having a web which extends down through the slot of the base rail and has mounted on opposite sides thereof rollers 39 adapted to bear upwardly against and roll against the bottom faces of the top flanges of the rail. This traveller 38 is resiliently connected, preferably by a cluster or plurality of tension coil springs 40 with a plate or member 41 connected to the lens carrier, preferably at its bottom middle portion, directly over the traveller 38, said springs being preferably provided with adjusting nuts 42 for equalizing or individually adjusting their tension so as to subject the lens carrier B to a downward pull or tension tending to maintain its vertical center line always in the vertical plane of the lens axis with the carrier perpendicular to said axis. The lens carrier thus has an underslung, central, resilient or spring connection with an underlying traveller 38 held in travelling connection on the base rail so as to be always in a position centrally beneath the carrier, in any horizontal adjustment of the carrier along its supporting monorail.

Similarly, the copy carrier or holder C is connected by spring tension means 42 to a carriage or traveller 43 located centrally beneath the carrier to travel along the base rail 35 in connection therewith; and the illuminating carrier D also is similarly connected by spring tension means 44 to a traveller 45 located centrally beneath the illuminating carrier D and held in connection with and adapted to travel along the base rail 35. The travellers 43 and 45 may be like that 38 for the lens carrier, and the tensioning means 42, 44 connecting each of these travellers to its carrier, may, as described, comprise a cluster or plurality of tension coil spings connected as by adjusting nuts, with the bottom, central portion of its related carrier for adjusting the tension of the springs. Each of the copy and illuminating carriers is thus urged by its tensioning means to maintain its vertical, central line in the vertical plane of the axis of the lens, and to oppose swinging or shifting of the carrier away from such position.

Preferably, the sensitized plate carrier A comprises a rectangular main frame formed by two rigidly connected, rectangular frames 50 and 51, one in front of the other but spaced to provide a narrow space 52 between them for the reception and operation of the screen holder. The sensitized plate 53 is adapted to be held in place on the main frame 50 by any usual or suitable means, such as cross bars 54, and 55, mounted on the frame 50 for adjustment toward and from each other to accommodate sensitized plates of different sizes, and provided with retaining fingers 56 against which the sensitized plate rests and with clips 57 for holding the sensitized plate stationarily in place. Said sensitized plate carrier or frame is adapted to occupy an opening through a cross partition or wall 58 that provides a dark room in which the sensitized plate on the main frame is located, and, as shown, the main frame 50—51 is made with a peripheral flange 59 projecting from the frame in a plane parallel with the sensitized plate and adapted to extend between spaced panels or boards of the partition wall 58 to form a light trap to prevent entrance of light into the dark room around edges of the plate carrier frame. Any other usual or suitable means forming a light trap could be employed.

In the space 52, between the frames 50, 51, a frame or holder 60 for the photomechanical screen is rotatably mounted so that by rotating it as indicated by the broken circular line 60x, either of two screens or grids 61, 62 secured on the frame, one above and one below its axis of rotation, can be placed in operative position in front of the sensitized plate. This screen holder may be rotatably supported, as by a journal or pivot 63 passing centrally through the holder and bearing at its opposite ends in the spaced frames 50, 51. A locking device, which may be a pin 64, movably mounted on the main frame 50, is adapted to be engaged in either of two sockets 65 at opposite ends of the screen holder for releasably retaining it with either of its screens in operative position in front of the sensitized plate. The screens or grids 61, 62, may be of different sized mesh or otherwise of different character adapted for producing one or another required printing texture on the sensitized plate. When one screen is in place in front of the sensitized plate, and it is desired to use the second screen, it is only necessary to release the lock pin 64 and rotate the holder to bring the second screen into operative position and secure it by the pin 64. This enables quick and easy replacement of one screen by the other. When either screen is in operative position, the other occupies a position vertically below it at the lower part of the camera, and there is not the tendency to throw the camera out of balance or off-center, which would be the case with a screen holder arranged to shift laterally to one side or the other of the central plane of the camera for replacing one screen by the other. When it is desired to make high light exposures, it is simply necessary to remove one screen and place the screen holder with its empty screen opening in front of the sensitized plate.

The copyholder or carrier C is, of course, provided with suitable means for holding the copy or copy plates in place thereon, but since my invention is not concerned with the holding means, they are conventionally illustrated as clips 67, adjustably mounted on the rectangular frame of the copy carrier so as to be adjustable thereon to properly engage and hold copy plates of different sizes or forms.

In the use of the camera for making phototemplates, the metal or plastic plates or parts for forming the templates are mounted on the copyholder or carrier C to receive images projected through the lens onto their sensitized surfaces. Such metal or plastic plates are often heavy, and if they are of non-symmetrical shape or are placed on the copyholder with their centers of gravity off of the vertical center of the carrier, they would have a tendency to throw the copyholder or carrier out of balance or out of its intended centered position. However, the described suspension of the carrier from the monorail and the cooperating tensioning means 42 which produce a central, downward tension or pull on the carrier, serve to retain it in its centered position with reference to the vertical plane of the lens axis and counteract any unbalanced condition thereof, due to the unbalanced weight of the templates or other copy mounted on the carrier.

The illuminating carrier or holder D for the source of light or lamps for illuminating the copy is preferably, as shown, in the form of a rectangular, open frame 70, having a central opening for the projection therethrough of the image of the copy. This frame is provided around its four sides or periphery with a rectangular reflector 71 disposed to reflect the light from the lamps to the copyholder. The lamps may be in the form of tubes 72, such for example, as fluorescent light tubes, but of greater intensity, disposed around the central opening of the frame 70. Such arrangement of the lamps and reflectors gives even distribution of the light over the surface of the copyholder, thus eliminating the use of arc lamps and eliminating hot spots which arc lamps have a tendency to produce in illuminating large copy. In addition, this illuminating device lends itself to better color penetration in the darker areas and permits pickup during exposure in the dark portions of the copy.

Furthermore, as illustrated in Figs. 5 and 6, this open frame illuminating device also adapts the camera for making photoprinting plates from transparencies. For this purpose, an opaque mask board or plate 73 releasably hold in the rectangular frame 70, as by holding clips or devices 74 of any suitable type, is provided with a central opening 75, in which is suitably retained a transparency or transparent plate 76 on the face of which transparencies may be secured in any required relation for reproduction. These transparencies can be either glass plates or films, or a number of pieces of film placed as needed to make a composite image. The plate 76 may be removably secured in the opening of the mask board, for example, by forming the mask board around its central opening with inwardly projecting flanges 77 against which the edges of the transparent plate 76 are held by suitable clips or holding devices 78 of any appropriate construction. When the camera is used for making photoprints from transparencies, a sheet of white paper or other suitable light-reflecting surface is placed on the copyholder C, and the light from the lamps of the illuminating device D is reflected by this surface through the transparency to the lens, thus projecting the image or subject of the transparency through the lens to the sensitized plate of the camera.

Any usual or suitable means can be provided if required, for adjusting or propelling the adjustable camera elements B, C, D, along their supporting rail. For example, adjusting mechanism, as small motors or other means, which may be either operated at the individual elements or controlled from the dark room, and locking means for holding the elements in the positions to which they may be adjusted, such as disclosed in my said Patent No. 2,150,974, may be employed. These adjusting and locking means are not herein disclosed since they are not essential to an understanding of the invention of this application.

I claim as my invention:

1. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, supports disposed at spaced points lengthwise of said monorail by which said rail is resiliently supported, independent tension means for each of said adjustable carriers, and means with which said tension means cooperates in any adjustment of said carrier to exert a resilient downward tension on the carrier in its various adjustments.

2. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, two spring supports disposed at spaced points lengthwise of said monorail by which said rail is resiliently supported so as to be capable of limited bodily yielding motion, independent tension means for each of said adjustable carriers adjustable with the carrier, and means against which said tension means reacts to exert resilient downward tension on the carrier in its various adjustments.

3. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, supports disposed at spaced points lengthwise of said monorail by which said rail is resiliently supported, a relatively stationary member, and an independent tension means for each of said adjustable carriers connected to said carrier and having travelling connection with said stationary member to exert yielding downward tension on said carrier in the direction of the vertical plane of the axis of said lens in the various adjustments of said carrier.

4. In a camera of the character described, comprising a carrier supporting a sensitized plate, and a copy carrier, and a lens carried with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, supports disposed at spaced points lengthwise of said monorail by which said rail is resiliently supported, a stationary bottom lengthwise extending rail, and a tensioning means connected to and adjustable with each of said lens and copy carriers and having a lengthwise travelling connection with said bottom rail and arranged to exert a yielding downward tension on said carrier in the direction of the vertical plane of the axis of said lens.

5. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, supports disposed at spaced points lengthwise of said monorail by which said rail is resiliently supported, a base rail disposed below said carriers parallel with and in the vertical plane of said monorail, and a separate traveller for each of said adjustable carriers held in travelling connection with said base rail to travel therealong with said carrier and a resilient connection between each of said travellers and its related carrier and exerting downward tension on said carrier to opposite sidewise motion thereof.

6. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, supports disposed at spaced points lengthwise of said monorail by which said rail is resiliently supported, a base rail disposed below said carriers parallel with and in the vertical plane of said monorail, and an underslung central traveller on each of said adjustable carriers having a vertically resilient connection with the carrier and held in travelling connection with said base rail to travel therealong with said carrier to yieldingly resist sidewise motion of said carrier.

7. An improved camera according to claim 1 which also comprises an open frame forming a carrier for a light source which is suspended from and adjustable along said monorail.

8. An improved camera according to claim 1, including a screen holder carrying different screens arranged one below another and suspended from said monorail to rotate in a plane parallel with the sensitized plate about a central point between said screens for placing one or another screen in operative relation to the sensitized plate.

9. An improved camera according to claim 1, including a screen holder carrying different screens arranged one below another and mounted on said sensitized plate carrier to rotate in a plane parallel with the sensitized plate about an axis between said screens for placing one or another screen in operative relation to the sensitized plate.

10. In a camera of the character described, comprising a carrier supporting a sensitized plate, and a copy carrier, and a lens carrier with a lens disposed approximately vertically and in planes parallel with that of the sensitized plate, the improvement which comprises an overhead rigid monorail extending lengthwise approximately parallel with and in the vertical plane of the axis of the lens from which rail said carriers are suspended and on which said lens and copy carriers are adjustable along the rail, an open frame forming a carrier for a light source suspended from and adjustable along said monorail and having the light source disposed along the margins of said frame about the frame opening, supports disposed at spaced points lengthwise of said monorail by which said rail is resiliently supported, a relatively stationary member, and an independent tension means for each of said adjustable carriers connected to said carrier and having travelling connection with said stationary member to exert yielding downward tension on said carrier in the direction of the vertical plane of the axis of said lens in the various adjustments of said carrier.

11. In a camera of the character described, comprising a carrier supporting a sensitized surface, and a copy carrier, and a lens carrier with a lens disposed in approximately vertical planes parallel with that of the sensitized surface and perpendicular to the axis of the lens, the improvement which comprises an overhead rigid guide extending lengthwise approximately parallel with the axis of the lens from which guide said carriers are suspended and along which guide at least one of said carriers is adjustable relatively toward and from said other carriers, resilient supports disposed at points spaced lengthwise of said guide by which the guide is supported for bodily resilience in the vertical plane thereof, tension means for said adjustable carrier, and means with which said tension means cooperates in any adjustment of said carrier to exert a resilient downward tension on the carrier in its various adjustments.

WILLIAM C. HUEBNER.